UNITED STATES PATENT OFFICE.

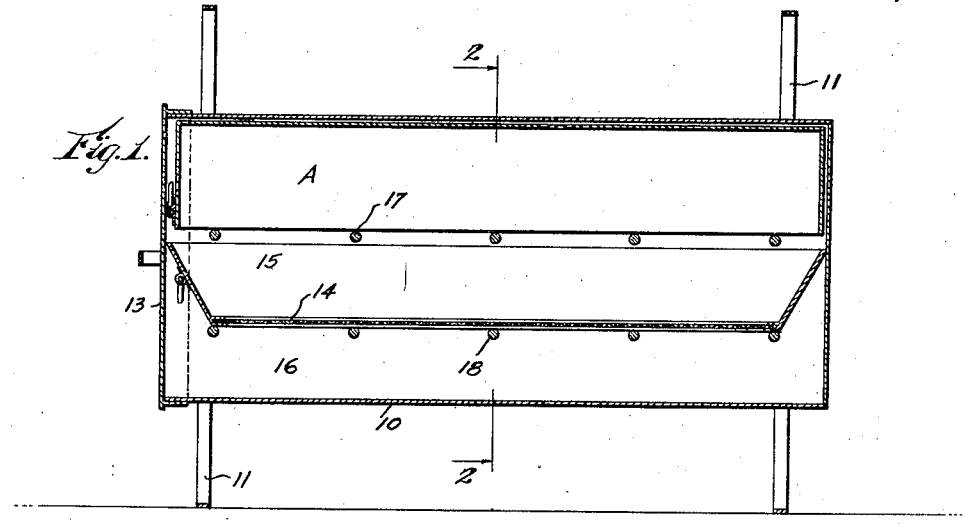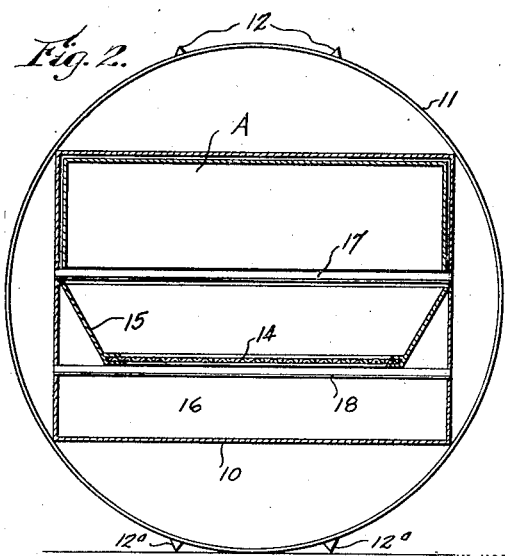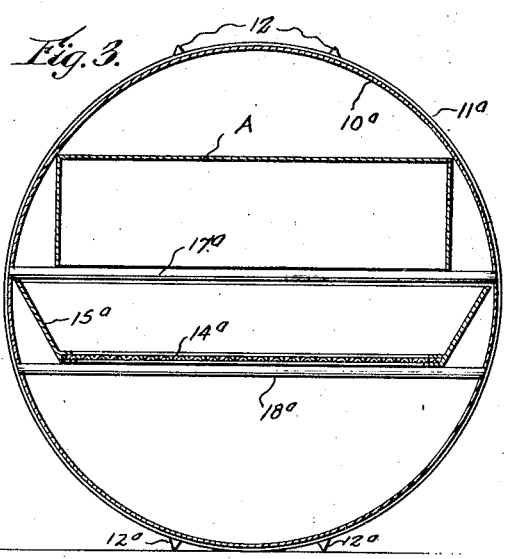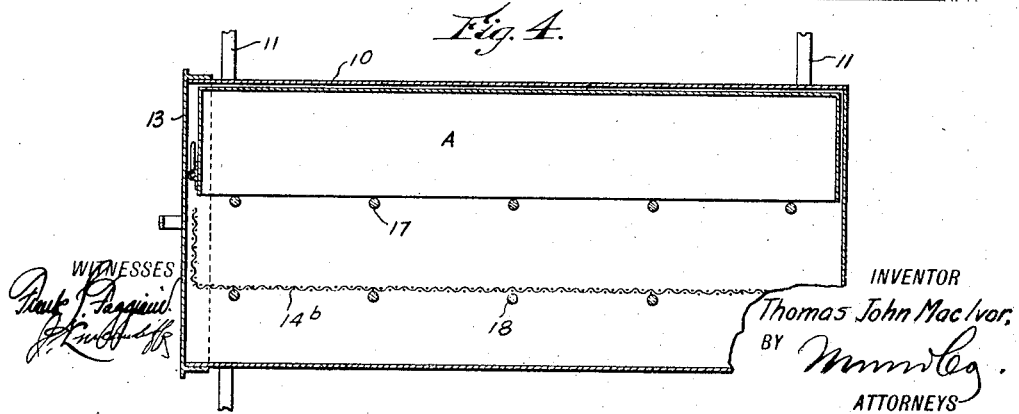

THOMAS JOHN MacIVOR, OF LONDON, ONTARIO, CANADA.

ASH-SIFTER.

1,328,174.  Specification of Letters Patent.  Patented Jan. 13, 1920.

Application filed February 10, 1919. Serial No. 276,137.

*To all whom it may concern:*

Be it known that I, THOMAS JOHN MAC-IVOR, a subject of the King of Great Britain, and a resident of London, Province of Ontario, Dominion of Canada, have invented a new and Improved Ash-Sifter, of which the following is a description.

My invention relates to ash sifters and has for its general object to provide a portable sifter arranged to receive bodily the ordinary ash pan of a furnace, range, or stove, and adapted to be turned through 180° to invert the ash pan and dump its contents into the sifter, the sifter being adapted to be rocked to effect the sifting.

A further object of the invention is to provide a sifter of the indicated character of simple and strong construction and arranged to be closed tightly against the escape of ashes during the sifting operation.

Reference is to be had to the accompanying drawings forming a part of this specification, it being understood that the drawings are merely illustrative of practical examples of the invention.

Figure 1 is a longitudinal vertical section of a sifter embodying my invention in one form;

Fig. 2 is a transverse vertical section on the line 2—2, Fig. 1;

Fig. 3 is a section similar to Fig. 2 but showing a modification;

Fig. 4 is a longitudinal vertical section of a further modification.

In carrying out my invention in practice, an elongated container 10 is provided, which in the form shown in Fig. 1, is rectangular in cross section. In order to provide for turning and rocking the container the same is provided with round hoops 11 at the ends forming the support for the container and adapted to rock on a floor or like surface. The hoops are provided at the top and bottom with pairs of spurs or very short legs 12, 12$^a$. The container 10 is adapted to receive the ash pan A of a furnace, range, or the like, said pan being adapted to be entered and removed through the open front end of the container, a suitable cover 13 being provided to close said end. The drawings show the sifter in position with the ash pan inverted as after having been dumped, in which position the sifter rests on one pair of legs 12$^a$. When the ash pan is to be placed in the container, the sifter rests on the opposite pair of legs 12. The container 10 is provided with a chamber for the ashes to be sifted, the same being provided with a screen or sieve 14, said screen, in the form of the invention shown in Figs. 1 and 2, being provided in a removable cinder holder 15. Below the screen 14 is a chamber or space 16 in the form of a container for sifted ashes.

I provide means within the container to afford support for the ash pan in the inverted position and to brace and support the screen 14 for which purpose in the preferred construction, two series of transverse bars 17, 18 are provided in the container 10, the bars 17 serving to support the inverted ash pan A and the other series of bars 18 constituting supports for the screen 14. With the described arrangement, when it is desired to place in the container the pan A filled with ashes, the structure is turned to a position as to rest on the spurs 12, so that the ash pan may then be slid into the container 10 through the open front end thereof beneath the bar 17. The cover 13 is then placed in position to close the container. The sifter is then turned about its own axis through 180° to the position shown in the drawings and resting on the legs 12$^a$, thereby inverting the ash pan A for dumping its contents into the sifting chamber having the sieve 14. The sifting operation may now be performed by rocking the structure back and forth, the legs 12$^a$ serving to give a jarring action to the sifter.

In the form shown in Fig. 3 instead of the container 10$^a$ being rectangular in cross section, it is cylindrical, so that the structure in this instance may roll directly on said cylindrical container. In this form of the invention, the same supporting means for the inverted ash pan and for the removable cinder pan is provided consisting of the cross bars 17$^a$, 18$^a$, and a removable cinder pan 15$^a$ may be employed, having the sieve 14$^a$. The described spurs 12 and 12$^a$ are provided on the cylindrical container and bands 11$^a$ may be provided with the spurs and utilized as a convenient means for applying the spurs to the structure.

In Fig. 4 the container 10 is in all respects the same as in Figs. 1 and 2, the hoops 11 being provided as well as the cover 13 and the cross bars 17, 18. The sieve 14$^b$ in the form shown in Fig. 4 is fixed instead of constituting the bottom of a removable pan as in the other figures.

It will be apparent that marked advantages are obtained by my improved sifter, among which are the following: The sifting can be performed with convenience and despatch; the objectionable dust incident to the ordinary way of sifting is practically eliminated; the structure is in compact form and the ashes are taken directly in the furnace pan and deposited in the container without the objectionable step of dumping the ash pan to deposit the ashes into the container; the ashes are sifted by a turning movement without providing the sifter with a shaft and bearings which are likely to wear and become loose; all driving gears and the like are eliminated for effecting a turning movement, by reason of the bodily rocking movement of the structure; the container is adapted to receive pans of different sizes since it is not necessary that the pan fit snugly in the container and thus, the necessity of providing sifters of different sizes is overcome; and the jarring movement given to the sifter in rocking produces an effective sifting action so that the sifting can be done much more quickly than with only a turning or rocking movement.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. An ash sifter adapted to receive bodily the ash pan of a furnace, stove, or the like, said sifter being bodily turnable through an angle to invert the ash pan, a receiving chamber in said sifter for the ashes to be sifted and adapted to receive said ashes by the inverting of the ash pan and a sifter bottom in said chamber, said sifter presenting a rounded external surface permitting of the bodily rocking of the sifter on a floor or like support to effect the sifting operation.

2. An ash sifter adapted to receive bodily the ash pan of a furnace, stove, or the like, said sifter being bodily turnable through an angle to invert the ash pan, a receiving chamber in said container for the ashes to be sifted and adapted to receive said ashes by the inverting of the ash pan and a sifter bottom in said chamber, said sifter presenting a rounded external surface permitting of the bodily rocking of the sifter on a floor or like support to effect the sifting operation; together with external projecting members on the sifter in position to contact with the floor or other support in the rocking of the sifter to thereby jar the sifter when it is rocked.

3. An ash sifter presenting a round exterior and adapted to rest on a floor or like supporting surface and bodily rockable to effect the sifting operation, said sifter having a chamber adapted to receive the ashes to be sifted, a chamber to receive the sifted ashes, and a sieve separating said chambers.

4. An ash sifter presenting a round exterior and adapted to rest on a floor or like supporting surface and bodily rockable to effect the sifting operation, said sifter having a chamber adapted to receive the ashes to be sifted, a chamber to receive the sifted ashes, and a sieve separating said chambers; together with means on the exterior of the sifter to cause a jarring of the same when the sifter is bodily rocked on the supporting surface.

THOMAS JOHN MacIVOR.